(12) United States Patent
Wu et al.

(10) Patent No.: US 10,787,158 B2
(45) Date of Patent: Sep. 29, 2020

(54) BRAKE SYSTEM

(71) Applicant: Acer Incorporated, New Taipei (TW)

(72) Inventors: Tsung-Hsun Wu, New Taipei (TW);
Wen-Shu Lee, New Taipei (TW);
Kuo-Hui Chang, New Taipei (TW);
Chih-Kai Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 61 days.

(21) Appl. No.: 16/200,572

(22) Filed: Nov. 26, 2018

(65) Prior Publication Data

US 2020/0094803 A1 Mar. 26, 2020

(30) Foreign Application Priority Data

Sep. 26, 2018 (TW) .............................. 107133921 A

(51) Int. Cl.
| | | |
|---|---|---|
| *B60T 13/20* | (2006.01) | |
| *B60T 7/12* | (2006.01) | |
| *F04B 17/03* | (2006.01) | |
| *F04B 9/04* | (2006.01) | |
| *B60T 17/02* | (2006.01) | |

(52) U.S. Cl.
CPC ............. *B60T 13/20* (2013.01); *B60T 7/12* (2013.01); *B60T 17/02* (2013.01); *F04B 9/042* (2013.01); *F04B 17/03* (2013.01)

(58) Field of Classification Search
CPC .. B60T 8/48; B60T 11/18; F04B 49/06; F04B 9/04
See application file for complete search history.

(56) References Cited

U.S. PATENT DOCUMENTS

| | | | | | |
|---|---|---|---|---|---|
| 2,270,586 | A | * | 1/1942 | Jahant ................... | B60T 8/3295 |
| | | | | | 188/152 |
| 3,032,995 | A | * | 5/1962 | Knowles ................. | B60T 13/18 |
| | | | | | 60/566 |
| 3,333,543 | A | * | 8/1967 | Gaston .................. | F04B 7/0053 |
| | | | | | 417/415 |
| 4,025,124 | A | * | 5/1977 | Fuchs ................... | G01P 15/032 |
| | | | | | 303/10 |
| 4,838,622 | A | * | 6/1989 | Kircher ................. | B60T 8/4266 |
| | | | | | 303/113.2 |

(Continued)

FOREIGN PATENT DOCUMENTS

| | | |
|---|---|---|
| CN | 102596667 | 7/2012 |
| CN | 102811895 | 12/2012 |

(Continued)

*Primary Examiner* — Bradley T King
*Assistant Examiner* — Mahbubur Rashid
(74) *Attorney, Agent, or Firm* — JCIPRNET

(57) ABSTRACT

A brake system including a base, a driving motor, a cam, a braking pump, a rotating column, and a bearing shaft. The base has an accommodating space. The driving motor is disposed on the base and located in the accommodating space. The cam is pivoted to the driving motor, and the driving motor is adapted to drive the cam to rotate relative to the base. The braking pump is disposed outside the base. The rotating column is rotatably disposed outside the base and connected to the braking pump. The bearing shaft is connected to the rotating column and extended into the accommodating space so as to radially in contact with the cam.

9 Claims, 7 Drawing Sheets

(56) References Cited

U.S. PATENT DOCUMENTS

| | | | | |
|---|---|---|---|---|
| 5,026,126 A * | 6/1991 | Umasankar | ............ | B60T 8/4863 |
| | | | | 188/162 |
| 5,042,885 A * | 8/1991 | Villec | .................... | B60T 8/4225 |
| | | | | 303/115.2 |
| 5,211,455 A * | 5/1993 | Matouka | ................ | B60T 8/4266 |
| | | | | 303/115.2 |
| 5,499,865 A * | 3/1996 | Katagiri | ..................... | B60T 7/12 |
| | | | | 137/614.14 |
| 5,842,752 A * | 12/1998 | Sekiguchi | ............. | B60T 8/4022 |
| | | | | 303/116.4 |
| 7,475,952 B2 * | 1/2009 | Reuter | .................... | B60T 8/341 |
| | | | | 303/116.2 |
| 2005/0244276 A1 * | 11/2005 | Pfister | ....................... | F04B 9/02 |
| | | | | 417/12 |
| 2017/0327100 A1 * | 11/2017 | Wiesen | ................... | B60T 13/40 |

FOREIGN PATENT DOCUMENTS

| | | | | |
|---|---|---|---|---|
| CN | 105196991 | | 12/2015 | |
| CN | 207328419 | | 5/2018 | |
| DE | 102013223091 A1 * | | 5/2015 | ............. H02K 7/075 |
| WO | 2011003877 | | 1/2011 | |

* cited by examiner

BRAKE SYSTEM

CROSS-REFERENCE TO RELATED APPLICATION

This application claims the priority benefit of Taiwan application serial no. 107133921, filed on Sep. 26, 2018. The entirety of the above-mentioned patent application is hereby incorporated by reference herein and made a part of this specification.

BACKGROUND OF THE DISCLOSURE

Field of the Disclosure

The disclosure relates to a brake system, and more particularly to a brake system that can be manually controlled when in a self-driving mode.

Description of Related Art

The existing vehicle brake system is roughly divided into two types: manual control brake and automatic control brake. The manual control brake is performed mainly by stepping on the brake plate to drive the brake structure to contact and rub against the tire to achieve deceleration. The automatic control brake is mainly applied to self-driving vehicles. The main control terminal of the self-driving vehicle makes judgment on obstacles and road conditions in the enviromnent through various sensors, and then controls the motor to drive the brake structure to achieve automatic deceleration.

However, the existing self-driving brake system is only controlled by its main control terminal. When signal error is occurred to the main control terminal, the brake structure can be excessively rotated or reversed, resulting in damage or deformation of the linkage or other structure. Or, the brake structure fails to work; as a result, the speed of the vehicle is not decelerated as expected, leading to vehicle accidents.

SUMMARY OF THE DISCLOSURE

The disclosure provides a brake system, capable of improving the condition where the structure is damaged or deformed due to excessive rotation and reversal. When brake system is not automatically operated, the brake system can also be driven by an external force.

The brake system of the disclosure includes a base, a driving motor, a cam, a braking pump, a rotating column, and a bearing shaft. The base has an accommodating space. The driving motor is configured on the base and located in the accommodating space. The cam is pivoted to the driving motor and the driving motor is adapted to drive the cam to rotate relative to the base. The braking pump is disposed outside the base. The rotating column is rotatably disposed outside the base and connected to the braking pump. The bearing shaft is connected to the rotating column and extended into the accommodating space to align with and contact the cam.

Based on the above, the brake system of the disclosure is adapted for self-driving vehicles, and the main control terminal of the self-driving vehicle controls the driving motor to rotate, and applies force to the braking pump through the cam, the bearing shaft and the rotating column for the self-driving vehicle to achieve deceleration. Since the disclosure employs a cam, when the driving motor is rotated excessively or reversely, the buffering effect of the cam can avoid damage or deformation of the bearing shaft or other components. In addition, the bearing shaft of the disclosure is only in alignment contact with the bearing shaft, and the two are still separate components. When the driving motor is not in operation, the user can still drive the rotating column separately through external force, and the force can be applied to the braking pump so as for the self-driving vehicle to achieve deceleration.

In order to make the aforementioned features and advantages of the disclosure more comprehensible, embodiments accompanying figures are described in detail below.

DESCRIPTION OF EMBODIMENTS

Figure 1A:
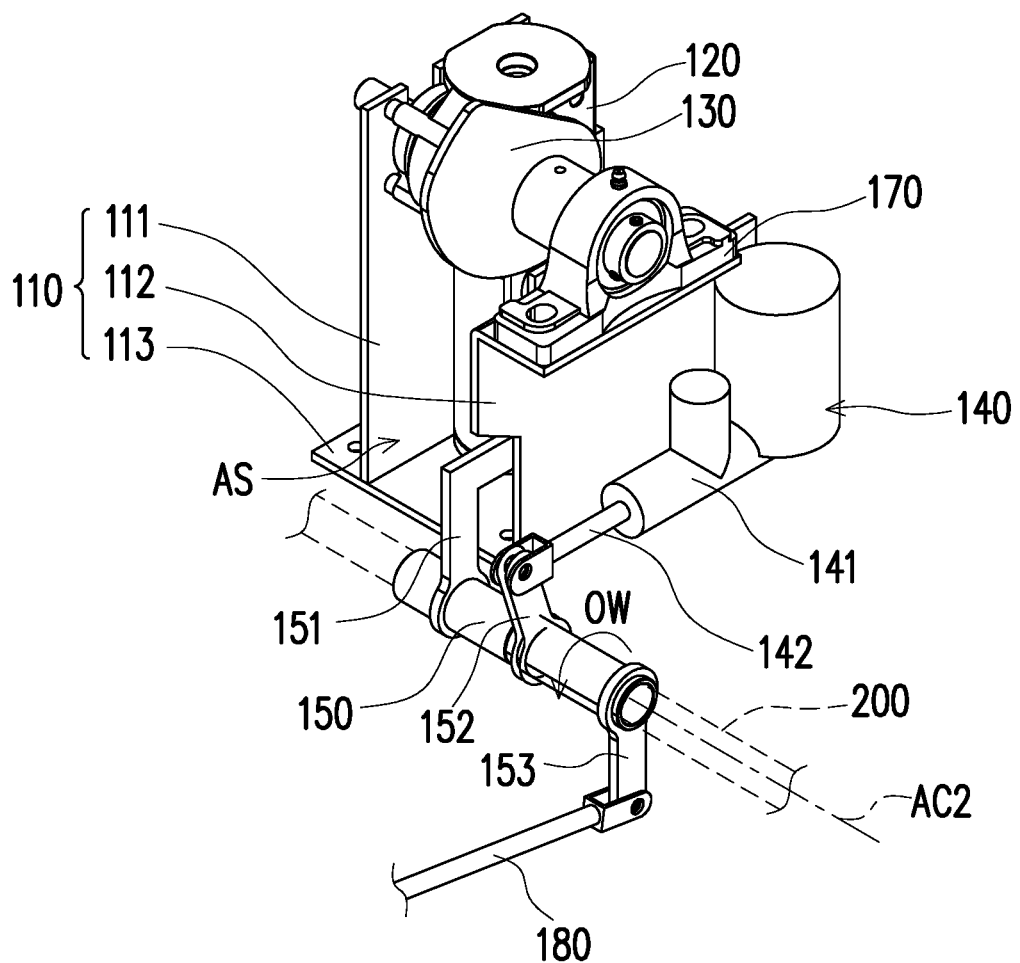
FIG. 1A is a schematic perspective view of a brake system according to an embodiment of the disclosure.
Figure 1B:
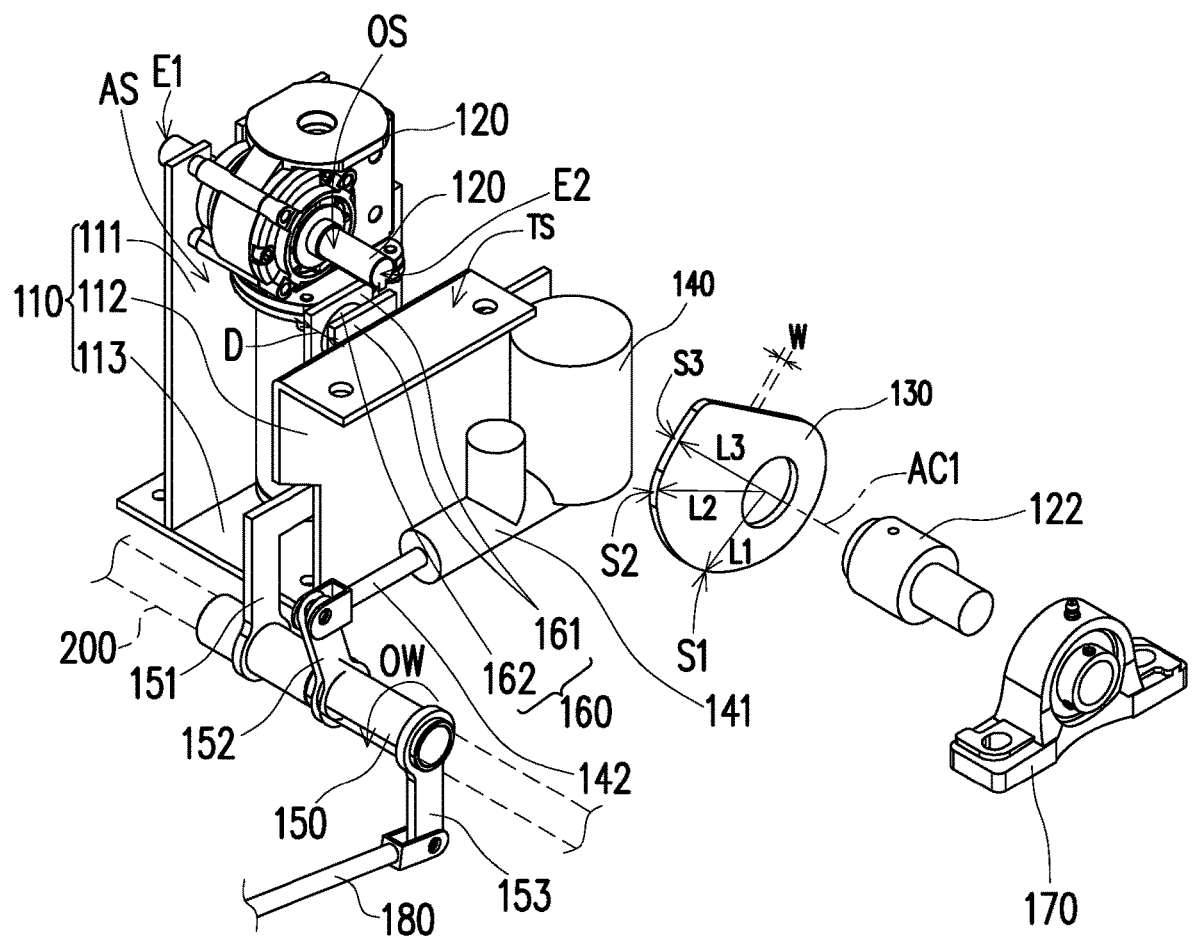
FIG. 1B is a schematic perspective exploded view of some components of the brake system in FIG. 1A.

FIG. 1A is a schematic perspective view of a brake system according to an embodiment of the disclosure. FIG. 1B is a schematic perspective exploded view of some components of the brake system in FIG. 1A.

Referring to FIG. 1A and FIG. 1B, a brake system 100 of the disclosure is adapted for self-driving vehicles, and the brake system 100 is controlled by a control core of the self-driving vehicle. Briefly, the self-driving vehicle can make judgment on obstacles and road conditions in the environment through various sensors, and transmit the sensing signals to the control core. The control core determines whether to accelerate or decelerate the speed of the vehicle by logical calculation. When the control core determines that deceleration is required, the brake system 100 is activated to achieve automatic deceleration.

The brake system 100 of the exemplary embodiment includes a base 110, a driving motor 120, a cam 130, a braking pump 140, a rotating column 150, a bearing shaft 160, and a fixing base 170.

The base 110 has a first mounting plate 111 and a second mounting plate 112 spaced apart and a base plate 113, and an accommodating space AS is formed between the first mounting plate 111 and the second mounting plate 112. Further, the first mounting plate 111 and the second mounting plate 112 are both extended upward vertically and opposite to each other in parallel, wherein the height of the first mounting plate 111 relative to the base plate 113 is greater than the height of the second mounting plate 112 relative to the base plate 113, and the second mounting plate 112 has a top surface TS extending away from the first mounting plate 111.

The driving motor 120 is mounted on the first mounting plate 111 of the base 100 and is located in the accommodating space AS. Further, the driving motor of the embodiment is, for example, a synchronous motor, a reversible motor, a DC motor, an AC motor, a pulse motor, or other motors having a pivoting function, and the disclosure is not limited thereto.

The cam 130 is pivoted to the driving motor 120, and the driving motor 120 is adapted to drive the cam 130 to rotate relative to the base 110. Further, the cam 130 has a displacement surface S1, a propping surface S2, and a buffer surface S3 adjacent to each other in sequence. The displacement surface S1, the propping surface S2, and the buffer surface S3 respectively has a first length L1, a second length L2, and a third length L3 relative to an axis AC1 of the driving motor 120 that are increased in sequence.

The braking pump 140 is disposed outside the base 110. In detail, the braking pump 140 is fixed outside the second mounting plate 112 of the base 110. The rotating column 150 is rotatably disposed outside the base 110 and connected to the braking pump 140. Specifically, the rotating column 150 is rotatably sleeved on an external rotating shaft 200, and the rotating shaft 200 is fixed in the self-driving vehicle, for example, so that the rotating column 150 rotates about the rotating shaft 200 as the axis AC2 to generate the counterclockwise and clockwise axial rotation.

The bearing shaft 160 is connected to the rotating column 150 and extended into the accommodating space AS of the base 110 to radially contact the cam 130. Further, the bearing shaft 160 has two positioning plates 161 spaced apart and a rotating portion 162 that is rotatably disposed between the two positioning plates 161. A gap D is provided between the two positioning plates 161, and the gap D is larger than the thickness W of the cam 130, so that the cam 130 can enter between the two positioning plates 161 to align with and contact the rotating portion 162 of the bearing shaft 160.

The fixing base 170 is disposed on the top surface TS of the second mounting plate 112. The driving motor 120 has a rotating shaft 121 and a retaining ring 122. The rotating shaft 121 extends toward the first mounting plate 111 and the fixing base 170, respectively. A first end E1 of the rotating shaft 121 penetrates the first mounting plate 111, and a second end E2 of the rotating shaft 121 is located above the second mounting plate 112. The retaining ring 122 is sleeved on a peripheral surface OS of the rotating shaft 121 extending from the second end E2 toward the cam 130 and axially penetrated in the fixing base 170. The cam 130 is secured on the retaining ring 122 and is located above the bearing shaft 160.

In detail, the retaining ring 122 is axially penetrated in the fixing base 170 such that shaking of the rotating shaft 121 and the retaining ring 122 can be prevented during the rotating process, and the stability of the rotation of the cam 130 can be maintained.

In the exemplary embodiment, the rotating column 150 has a first linkage 151, a second linkage 152, and a third linkage 153.

The first linkage 151 is secured on an outer wall surface OW of the rotating column 150 and extends in the accommodating space AS of the base 110. The bearing shaft 160 is connected to the first linkage 151 and correspondingly in contact with the cam 130.

The second linkage 152 is secured on the outer wall surface OW of the rotating column 150 and is aligned with the braking pump 140. The braking pump 140 includes a cylinder 141 and a pressing rod 142. The pressing rod 142 is retractably disposed through the cylinder 141 and pivoted to the second linkage 152.

The third linkage 153 is secured on an outer wall surface of the rotating column and relatively far away from the braking pump 140. In the exemplary embodiment, the brake system 100 has a transmission rod 180 pivoted to the third linkage 153. The transmission rod 180 is actually used to connect a pedal (not shown), and the pedal is adapted to be manually stepped on to provide an external force such that the transmission rod 180 drives the rotating column 150 to rotate through the third linkage 153.

Figure 2A:
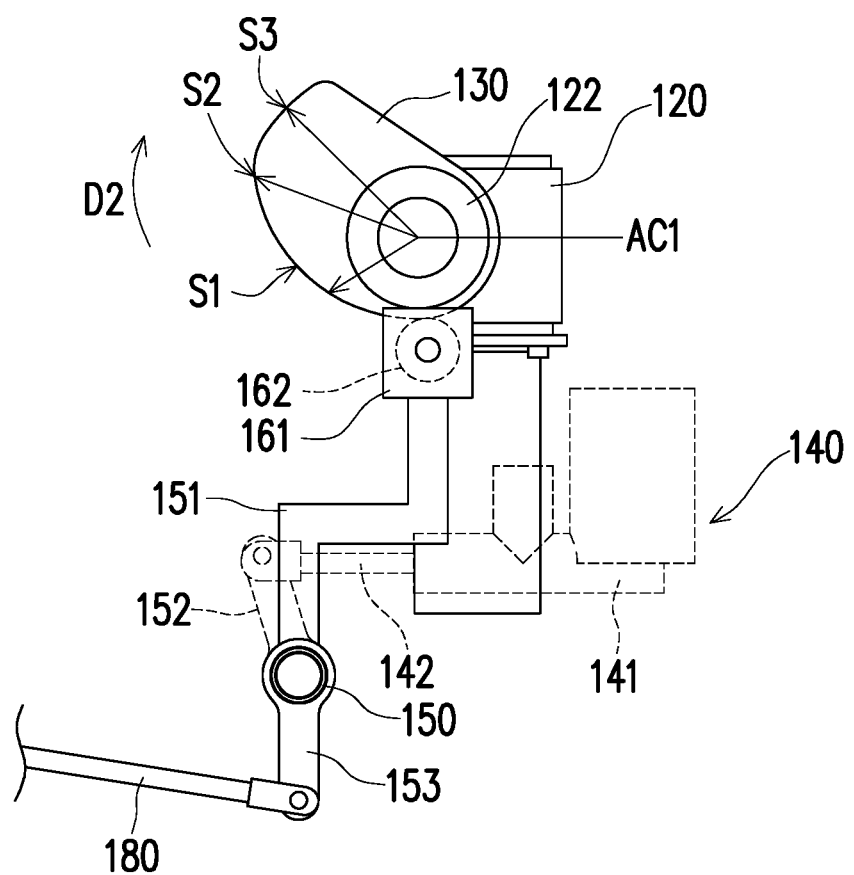
FIG. 2A is a schematic side view of some components of the brake system in FIG. 1A.
Figure 2B:
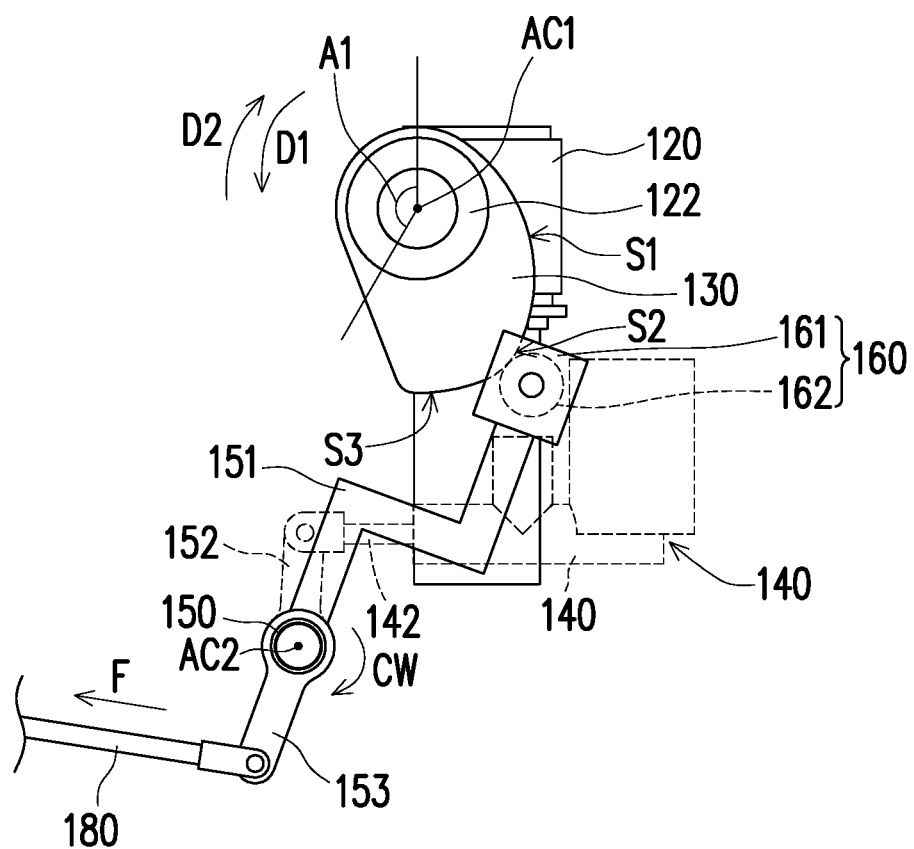
FIG. 2B is a schematic view illustrating a braking state in an automatic mode of the brake system in FIG. 2A.
Figure 2C:
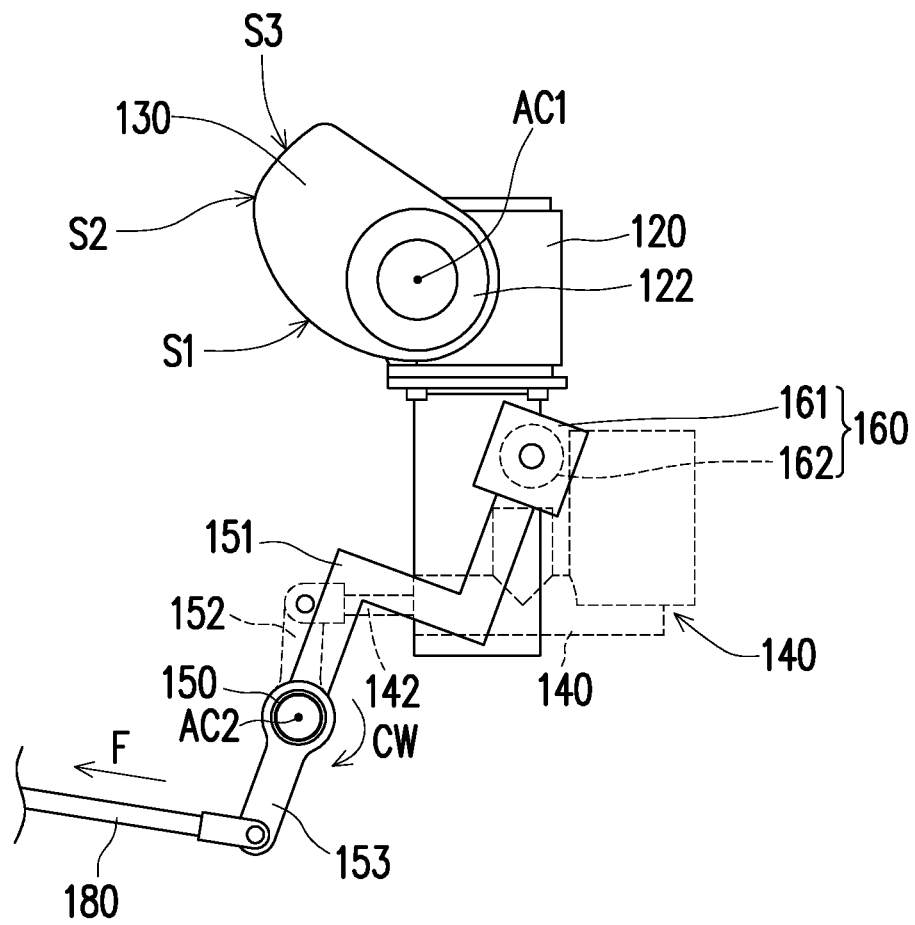
FIG. 2C is a schematic view illustrating a braking state in a manual mode of the brake system in FIG. 2A.

FIG. 2A is a schematic side view of some components of the brake system in FIG. 1A. FIG. 2B is a schematic view illustrating a braking state in an automatic mode of the brake system in FIG. 2A. FIG. 2C is a schematic view illustrating a braking state in a manual mode of the brake system in FIG. 2A.

Referring to FIG. 2A and FIG. 2B, the brake system 100 of the exemplary embodiment is in an automatic mode. On this occasion, the control core of the self-driving vehicle controls the driving motor 120 to operate, and drives the rotating shaft 121 and the cam 130 to rotate along a first rotating direction D1. When the cam 130 rotates along the first rotating direction D1, the displacement surface S1 of the cam 130 pushes against the rotating portion 162 of the bearing shaft 160 to drive the rotating column 150 to rotate in the clockwise direction CW through the first linkage 151, and applies force to the pressing rod 142 of the braking pump 140 through the second linkage 152. When the propping surface S2 of the cam 130 abuts against the rotating portion 162 of the bearing shaft 160, the braking pump 140 has produced a maximum thrust force. On this occasion, the cam 130 is rotated at 145 degrees along the first rotating direction D1.

When the control core of the self-driving vehicle is to release the deceleration state of the brake system 100, the rotation shaft 121 and the cam 130 are driven to rotate in a second rotating direction D2 opposite to the first rotating direction D1. When the cam 130 rotates in the second rotating direction D2 opposite to the first rotating direction D1, the propping surface S2 of the cam 130 releases the rotating portion 162 of the bearing shaft 160, and is in contact with the rotating portion 162 through the displacement surface S1. Since the first length L1 of the displacement surface S1 is smaller than the second length L2 of the propping surface S2, the braking pump 140 can be restored to the original position based on an external elastic component or its own always-open setting. On this occasion, the braking pump 140 has released the thrust force. In brief, when the cam 130 is rotated by the driving motor 120, the cam 130 pushes against the bearing shaft 160 and drives the rotating column 150 to pivot by the first linkage 151.

Referring to FIG. 2A and FIG. 2C, the brake system 100 of the exemplary embodiment is in a manual mode, and the user can drive the transmission rod 180 to move backward through the pedal, and drive the rotating column 150 to generate rotation in a clockwise direction CW along the axis AC2 through third linkage 153 while applying force to the pressing rod 142 of the braking pump 140 through the second linkage 152. Meanwhile, the bearing shaft 160 is relatively far away from the displacement surface S1 of the cam 130 along with the first linkage 151 of the rotating column 150.

In brief, when the rotating column 150 is driven by the external force F of the transmission rod 180 and rotates along a clockwise direction CW, the second linkage 152 simultaneously rotates and pushes the pressing rod 142 to move linearly to retract into the cylinder 141, such that the braking pump 140 can drive the brake pad (not shown) to decelerate while the first linkage 151 and the bearing shaft 160 are relatively far away from the cam 130.

Further, when the external force F subjected to the rotating column 150 is released, the cylinder 141 of the braking pump 140 can automatically push the pressing rod 142 back to the original position based on its own always-open setting or the external torsion spring of the transmission rod 180 and the elastic recovery of the elastic component.

Figure 3A:
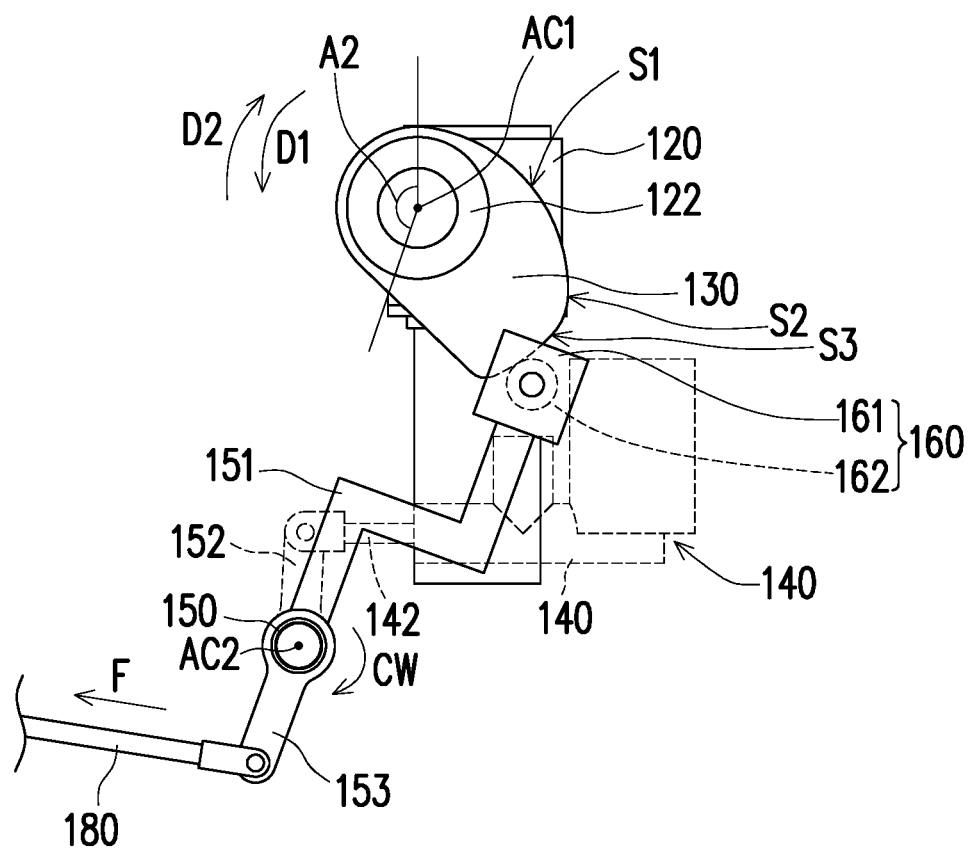
FIG. 3A is a schematic view illustrating a buffer state of the brake system in FIG. 2A.
Figure 3B:
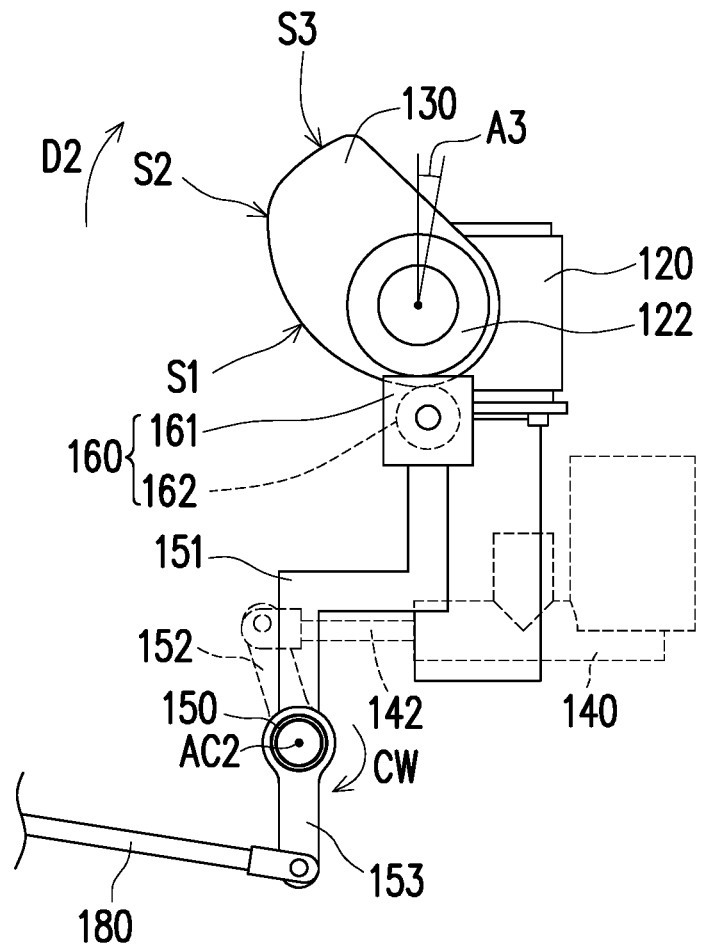
FIG. 3B is a schematic view illustrating a reverse state of the brake system in FIG. 2A.

FIG. 3A is a schematic view illustrating a buffer state of the brake system in FIG. 2A. FIG. 3B is a schematic view illustrating a reverse state of the brake system in FIG. 2A.

Referring to FIG. 2B and FIG. 3A, when the driving motor 120 drives the cam 130 to rotate along the first rotating direction D1 to an angle A1 (145 degrees), the maximum thrust force of the braking pump 140 is reached. Further, when the brake system 100 over-rotates the cam 130 due to a signal error or wear of a component, the buffer surface S3 is abutted against the rotating portion 162 of the bearing shaft 160. Since the third length L3 of the buffer surface S3 is slightly larger than the second length L2 of the propping surface S2, the cam 130 can be over-rotated to an angle A2 (170 degrees) along the first rotating direction D1 while continuously pushing against the bearing shaft 160, so that the braking pump 140 maintains the greatest thrust force.

Referring to FIG. 3B, when the brake system 100 causes the driving motor 120 to reverse to an angle A3 (10 degrees) along the second rotating direction D2 under the initial state due to a signal error, the curve characteristic of the cam 130 can avoid occurrence of damage or deformation.

In summary, the brake system of the disclosure is adapted for self-driving vehicles, and the main control terminal of the self-driving vehicle controls the driving motor to rotate, and applies force to the braking pump through the cam, the bearing shaft and the rotating column for the self-driving vehicle to achieve deceleration. Since the disclosure employs a cam, when the driving motor is rotated excessively or reversely, the buffering effect of the cam can avoid damage or deformation of the bearing shaft or other components. In addition, the bearing shaft of the disclosure is only in alignment contact with the bearing shaft, and the two are still separate components. When the driving motor is not in operation, the user can still drive the rotating column separately through external force, and the force can be applied to the braking pump so as for the self-driving vehicle to achieve deceleration.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A brake system, comprising:
a base, having an accommodating space;
a driving motor, disposed on the base and located in the accommodating space;
a cam, pivoted to the driving motor, and the driving motor adapted to drive the cam to rotate relative to the base;
a braking pump, disposed outside the base;
a rotating column, rotatably disposed outside the base and connected to the braking pump, wherein the rotating column has a third linkage secured on an outer wall surface of the rotating column and far away from the braking pump;
a bearing shaft, connected to the rotating column and rotated along with the rotating column, the bearing shaft extended within the accommodating space to radially contact the cam; and
a transmission rod, pivoted to the third linkage.

2. The brake system according to claim 1, wherein the base has a first mounting plate and a second mounting plate spaced apart, and the accommodating space is formed between the first mounting plate and the second mounting plate, the driving motor is fixed on the first mounting plate, and the braking pump is fixed on an outer surface of the second mounting plate.

3. The brake system according to claim 2, further comprising a fixing base disposed on the second mounting plate, the driving motor having a rotating shaft and a retaining ring, the rotating shaft extending toward the first mounting plate and the fixing base respectively, wherein a first end of the rotating shaft penetrates the first mounting plate, a second end of the rotating shaft is disposed above the second mounting plate, and the retaining ring is sleeved on a peripheral surface of the rotating shaft extending from the second end toward the cam and axially penetrated in the fixing base, and the cam is secured on the retaining ring and is disposed above the bearing shaft.

4. The brake system according to claim 1, wherein the cam has a displacement surface, a propping surface and a buffer surface adjacent to each other in sequence, and the displacement surface, the propping surface and the buffer surface respectively have a first length, a second length and a third length relative to an axis of the driving motor and are increased in sequence.

5. The brake system according to claim 1, wherein the bearing shaft has two positioning plates spaced apart from each other and a rotating portion, the rotating portion is rotatably disposed between the two positioning plates, wherein a gap is provided between the two positioning plates, the gap is larger than a thickness of the cam, and the cam is adapted to be disposed between the two positioning plates and in contact with the rotating portion.

6. The brake system according to claim 1, wherein the rotating column has a first linkage, the first linkage is secured on an outer wall surface of the rotating column and extended in the accommodating space, and the bearing shaft is connected to the first linkage.

7. The brake system according to claim 1, wherein the rotating column has a second linkage secured on an outer wall surface of the rotating column and aligned with the braking pump, the braking pump comprises a cylinder and a pressing rod, and the pressing rod is retractably disposed through the cylinder and pivoted to the second linkage.

8. The brake system according to claim 1, wherein when the cam is rotated along a first rotating direction, the cam pushes against the bearing shaft to drive the rotating column, thereby applying a force to the braking pump; when the cam is rotated along a second rotating direction opposite to the first rotating direction, the cam releases the bearing shaft, such that the braking pump is restored to an original position.

9. The brake system according to claim 1, wherein when the rotating column is rotated and applies a force to the braking pump, the bearing shaft is relatively far away from the cam along with the rotating column.

* * * * *